United States Patent
Narisako et al.

(10) Patent No.: US 8,444,744 B2
(45) Date of Patent: May 21, 2013

(54) METHOD FOR SEPARATING AND RECOVERING NICKEL AND LITHIUM

(75) Inventors: Makoto Narisako, Hitachi (JP); Toshiyuki Yamaoka, Hitachi (JP); Daisuke Kobayashi, Hitachi (JP); Naoki Higuchi, Hitachi (JP)

(73) Assignee: JX Nippon Mining & Metals Corporation, Tokyo (JP)

(*) Notice: Subject to any disclaimer, the term of this patent is extended or adjusted under 35 U.S.C. 154(b) by 344 days.

(21) Appl. No.: 12/878,488

(22) Filed: Sep. 9, 2010

(65) Prior Publication Data

US 2011/0072936 A1    Mar. 31, 2011

(30) Foreign Application Priority Data

Sep. 29, 2009 (JP) ................. 2009-224261

(51) Int. Cl.
*B01D 11/04* (2006.01)
*B22F 9/30* (2006.01)

(52) U.S. Cl.
USPC ................ 75/365; 75/370; 75/711; 75/745; 210/634; 210/638

(58) Field of Classification Search
USPC .............. 75/711, 745; 210/634, 638, 639
See application file for complete search history.

(56) References Cited

U.S. PATENT DOCUMENTS 5,173,210 A * 12/1992 Lindoy et al. ............... 252/184
6,267,936 B1 * 7/2001 Delmas et al. .............. 423/49
6,835,228 B1 12/2004 Lin et al.

FOREIGN PATENT DOCUMENTS

| JP | 2004-307983 A | 11/2004 |
|---|---|---|
| JP | 2006-057142 A | 3/2006 |
| JP | 2007-122885 A | 5/2007 |
| JP | 2008-231522 A | 10/2008 |
| JP | 2009-193778 A | 8/2009 |

OTHER PUBLICATIONS

Abstract of JP 2010-229534, published Oct. 14, 2010.*
European Search Report dated Jan. 18, 2011, issued in corresponding European Patent Application No. 10176128.6.
Xu, Jingui et al.; "A review of processes and technologies for the recycling of lithium-ion secondary batteries"; Journal of Power Sources, Elsevier SA, CH LNKD- DOI:10.1016/J.JPOWSOUR.2007, 11.074, vol. 177, No. 2, Jan. 14, 2008, pp. 512-527, P022450299.
Zhang, Pingwei et al.; "Hydrometallurgical Process for Recovery of Metal Values From Spent Lithium-Ion Secondary Batteries"; Hydrometallurgy, Elsevier Scientific Publishing CY. Amsterdam, NL LNKD-DOI:10.1016/SO304-386X(97) 00050-9, vol. 47, Jan. 1, 1998, pp. 259-271, XP002928037.
Zushi, Eita et al.; "Extraction of Lithium with 2-ethylhexyl phosphonic acid mono-2-ethylhexyl ester" Solvent Extraction Research Association of Solvent Extraction SAGA, JP, vol. 7, Jan. 2000, pp. 28-35, XP009139687.

* cited by examiner

*Primary Examiner* — George Wyszomierski
(74) *Attorney, Agent, or Firm* — Westerman, Hattori, Daniels & Adrian, LLP

(57) ABSTRACT

A method for extracting nickel and lithium includes solvent extraction step of using three or more extraction stages to subject a solution containing lithium and nickel to solvent extraction with 2-Ethylhexyl phosphonic acid mono-2-ethylhexyl ester at a pH of 8.0 to 8.5, whereby the nickel and the lithium are co-extracted into a resultant organic phase.

12 Claims, 4 Drawing Sheets

METHOD FOR SEPARATING AND RECOVERING NICKEL AND LITHIUM

CROSS REFERENCE TO RELATED APPLICATIONS AND INCORPORATION BY REFERENCE

This application is based upon and claims the benefit of priority from the prior Japanese Patent Application No. P2009-224261, filed on Sep. 29, 2009; the entire contents of which are incorporated herein by reference.

BACKGROUND OF THE INVENTION

1. Field of the Invention

The present invention relates to a method for recovering valuable metals from a spent lithium ion secondary battery, and wastes (for example, a cathode active material) generated in the method for producing a lithium ion secondary battery. More specifically, the invention relates to a method for extracting nickel and lithium from a solution generated when a cathode material of a lithium ion secondary battery is treated by extraction with a solvent, concentrating the solution into which lithium and nickel are extracted, separating nickel and lithium from each other by use of another solvent, and then recovering nickel in the form of nickel carbonate or nickel powder, and lithium in the form of lithium carbonate.

2. Description of the Related Art

The use manners of a lithium ion secondary battery have been rapidly spreading, and the production quantity thereof is expected to increase rapidly. In a lithium ion secondary battery, relatively expensive metals such as cobalt and nickel are used; however, under the present circumstance, it is not difficult to say that the process for recovering the metals has been established. It is evident that as the production quantity increases, the generation amount of spent lithium ion batteries, and that of cathode active materials and others that are discarded by the generation of defects in the production process and other causes also increase. Thus, it is important to recover manganese, cobalt, nickel, and lithium.

A process for recovering manganese, cobalt, nickel and lithium from spent lithium ion secondary batteries is disclosed in the Japanese Patent Application Laid-Open No. 2007-122885 (Patent Document 1). According to this process, cobalt and nickel cannot be effectively separated from each other. Unless cobalt- and nickel-refining steps and so on are separately carried out, cobalt and nickel cannot be individually recovered.

As a process for recovering cobalt, nickel and lithium, there has been known a solvent extraction process as disclosed in Japanese Patent Application Laid-Open No. 2008-231522 (Patent Document 2). This process is characterized in that even in a case where manganese is contained in a spent lithium ion secondary battery to which the process is to be applied, the process can cope with this case. However, in order to generate lithium carbonate from a solution remaining after cobalt, nickel and manganese are recovered, some operation for concentrating lithium is required when the concentration of lithium is small.

In the meantime, a process for recovering lithium from a lithium solution by solvent extraction has been also known. As disclosed in Japanese Patent Application Laid-Open No. 2006-57142 (Patent Document 3), in the case of making an attempt for recovering lithium in the form of a carbonate thereof, it is generally difficult to recover the carbonate from a thin solution of lithium. It is essential to concentrate the lithium solution by some method. As a method therefor, solvent extraction has been adopted in the Patent Document 3. This process makes it possible to recover only lithium, and may result in a high cost performance in the light of the price of lithium carbonate.

Japanese Patent Application Laid-Open No. 2004-307983 (Patent Document 4) discloses a β-hydrooxime type extractant (for example, trade name: LIX-841, manufactured by Cognis Co.) as a nickel-extracting agent. According to this extractant, lithium is hardly extracted when nickel is extracted; therefore, the extractant has an advantage that the performance of separating nickel and lithium from each other is high. However, it is necessary for a practical use thereof to improve the performance for back-extracting nickel. Moreover, according to this extractant, lithium cannot be concentrated although nickel can be concentrated. When the concentration of lithium is small in a solution from which nickel has been extracted, lithium cannot be recovered in the form of lithium carbonate unless lithium is concentrated.

In electrolytic recovery of nickel, it is generally necessary that the concentration of nickel in an electrolytic solution is about 50 g/L. From a solution having a concentration smaller than this concentration, an effective electrolytic recovery cannot be attained. Thus, about a solution having a small nickel concentration, it is necessary to increase the nickel concentration by some method. It is supposed to use, as the method for increasing the nickel concentration, a method for adding a carbonating agent and an alkaline agent to a solution having a small nickel concentration to precipitate nickel, and then dissolving this precipitation again, thereby yielding a solution having a required nickel concentration. However, according to this method, it is necessary to conduct a solid-liquid separating operation for recovering the precipitated nickel. Moreover, a neutralizing agent which cannot be recycled is also required.

SUMMARY OF THE INVENTION

The invention provides a process for recovering nickel in the form of electrolytic nickel, nickel carbonate or nickel powder and lithium in the form of lithium carbonate from a spent lithium ion secondary battery and a nickel- and lithium-containing solution that is obtained after a cathode active material generated in the process for producing a lithium ion secondary battery is effused.

The present invention solves the above problem. An aspect of the present invention includes the following features:

(1) A method for extracting nickel and lithium encompassing solvent extraction step of using three or more extraction stages to subject a solution containing lithium and nickel to solvent extraction with 2-Ethylhexyl phosphonic acid mono-2-ethylhexyl ester at a pH of 8.0 to 8.5, whereby the nickel and the lithium are co-extracted into a resultant organic phase.

(2) The method according to (1), further encompassing back extraction step of subjecting the resultant organic phase containing the nickel and the lithium to back extraction with a sulfuric acid solution, thereby concentrating the nickel and the lithium into a back extraction liquid.

(3) The method according to (2), further encompassing scavenging an oil phase of the back extraction liquid with a solution having an acid concentration higher than the sulfuric acid solution used in the back extraction step and effusing the nickel and the lithium remaining in the oil phase to a resultant water phase, thereby regenerating a solvent; and subsequently returning the regenerated solvent to the solvent extraction step.

(4) The method according to (2) or (3), further encompassing nickel extraction and carbonation step which encompasses: adjusting pH of a water phase of the back extraction liquid with sodium hydroxide; subjecting the pH-adjusted liquid to extraction with neodecanoic acid to selectively extract nickel into a resultant oil phase; and neutralizing the resultant oil phase by adding sodium carbonate to recover nickel in the form of nickel carbonate.

(5) The method according to (4), further encompassing neutralizing a liquid obtained by the nickel extraction and carbonation step with sodium carbonate to recover lithium in the form of lithium carbonate.

(6) The method according to (5), further encompassing neutralizing a liquid obtained by the nickel extraction and carbonation step with sodium carbonate to recover lithium in the form of lithium carbonate.

(7) The method according to (2), further encompassing adjusting pH of a water phase of the back extraction liquid with sodium hydroxide; subjecting the pH-adjusted liquid to extraction with neodecanoic acid to selectively extract nickel into a resultant oil phase; adding potassium oxalate to the resultant oil phase to produce a compound of nickel oxalate; and decomposing the compound thermally and recovering nickel powder.

When the processes for separating and recovering nickel and lithium are carried out, the following can be attained:

(1) Nickel and lithium can be effectively concentrated from a solution by solvent extraction.

(2) By subjecting the organic phase containing co-extracted nickel and lithium to back extraction, nickel and lithium in the organic phase can be concentrated into the resultant water phase, so that lithium can be concentrated into such a concentration that lithium carbonate can be recovered.

(3) By extracting nickel in the back extraction liquid in the item (2) selectively from this liquid, nickel carbonate can first be obtained. Furthermore, by adding the carbonating agent into the filtrate, lithium carbonate can be obtained.

DETAILED DESCRIPTION OF THE EMBODIMENT OF THE INVENTION

An embodiment of the invention will be described in detail hereinafter. However, it will be obvious to those skilled in the art that the present invention may be practiced without such specific details.

The solution to be treated by the present embodiment may be a solution obtained by scraping a spent lithium ion secondary battery or dissolving a cathode active material discarded in the process for manufacturing a lithium ion secondary battery. This solution contains mainly manganese, cobalt, nickel and lithium.

A treated liquid remaining after cobalt and manganese are recovered from the solution by an appropriate method is used as a liquid to be treated in the present embodiment.

Figure 1:
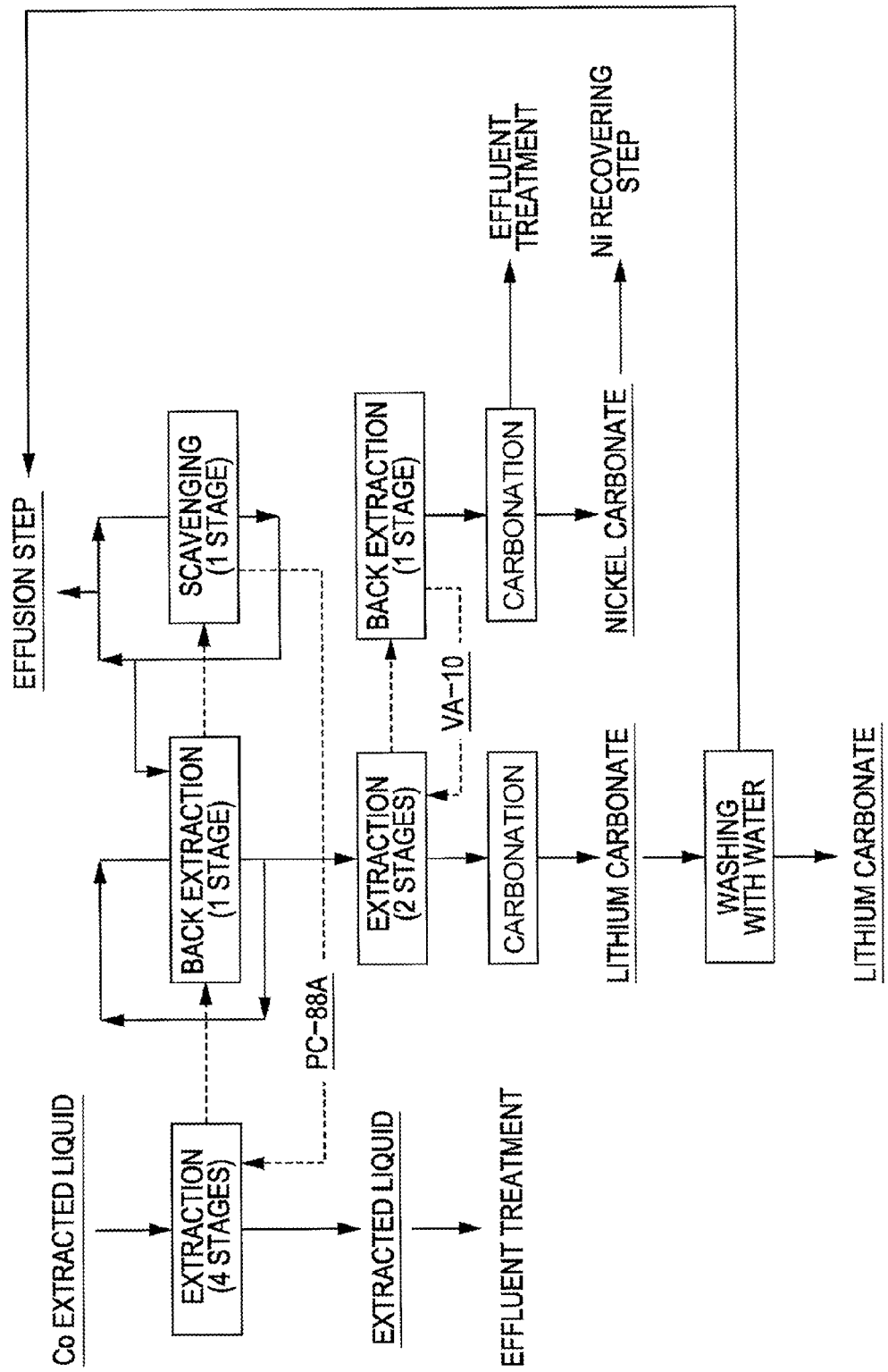
FIG. 1 is a process flow chart illustrating a method of separating and recovering nickel and lithium according to an embodiment of the present invention.
Figure 3:
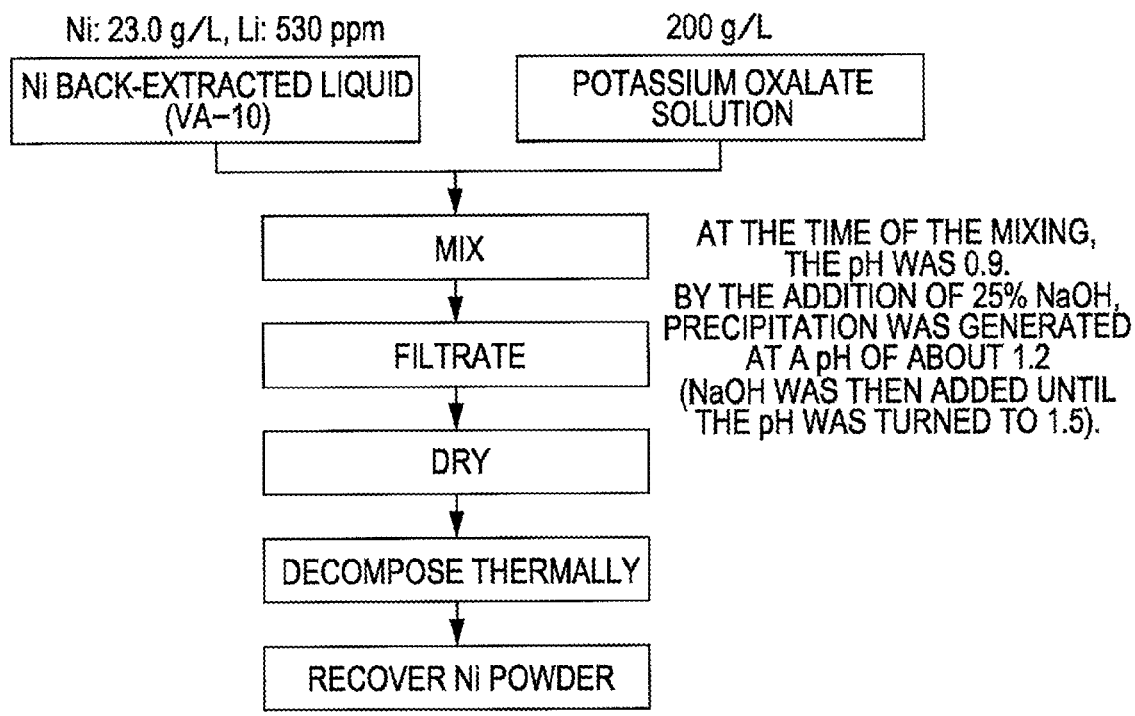
FIG. 3 is a process flow chart illustrating a method of recovering nickel powder according to the embodiment of the present invention.

FIGS. 1 and 3 illustrate an embodiment of separating nickel and lithium from a nickel and lithium solution as a treated liquid, and recovering nickel in the form of metallic nickel or nickel carbonate and lithium in the form lithium carbonate.

The treated liquid may be more specifically a liquid 5.0 to 15.0 g/L of nickel, 3.0 to 6.0 g/L of lithium, 0.01 to 0.03 g/L of cobalt, and less than 0.01 g/L of manganese.

-First Step (Ni and Li Solvent Extraction Step)-

As an extractant for nickel and lithium, 2-Ethylhexyl phosphonic acid mono-2-ethylhexyl ester, di(2-ethylhexyl) phosphoric acid, or the like is used. A solvent prepared by diluting this extractant with a hydrocarbon solvent is mixed with a solution containing nickel and lithium to attain solvent extraction of nickel and lithium.

In the present embodiment, three or more extraction stages may be suitably used to co-extract nickel and lithium. If less than three extraction stages are used, the co-extraction may not be appropriately conducted.

When nickel and lithium are extracted, the equilibrium pH of the solution is preferably from 8 to 8.5. If the pH is higher than this range, the Na content by percentage is to be high in a subsequent step of making the substance yielded by the process of the invention into a product. If the pH is lower than that range, the amount of nickel and lithium extracted into the organic phase may be too low.

When nickel and lithium are extracted, protons are released from the extractant; thus, the pH of the solution lowers. For this reason, nickel and lithium are together extracted while an alkaline agent such as a sodium hydroxide solution is added to the liquid in order to keep the pH. The used alkaline agent may be any alkaline agent as the agent is easily soluble into water. The sodium hydroxide solution is appropriate since the solution is easily available.

Figure 2:
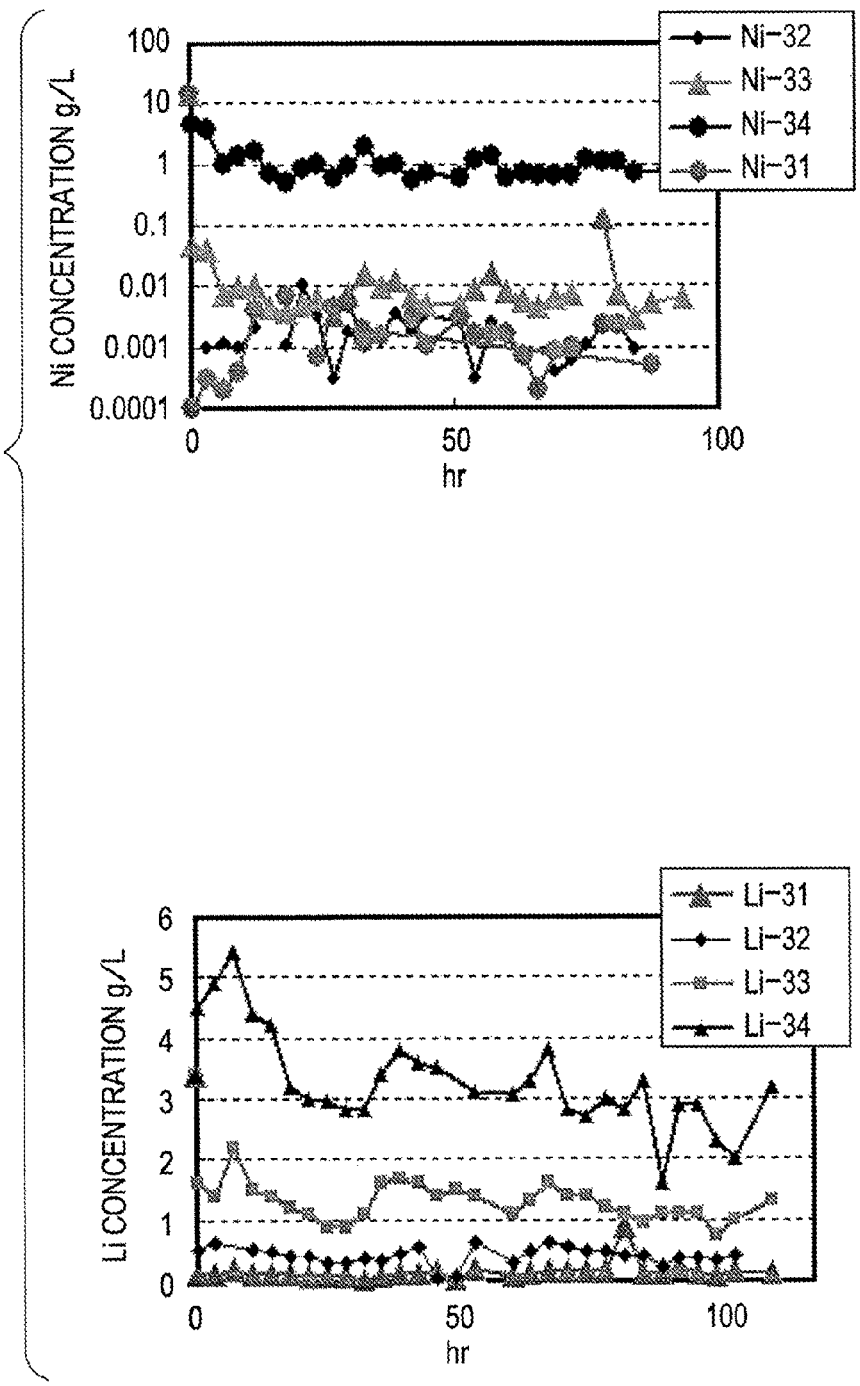
FIG. 2 is a graph showing changes in extraction results of nickel and lithium with the passage of time according to the embodiment of the present invention.

Changes in extraction results of nickel and lithium with the passage of time are shown in FIG. 2.

-Second Step (Back Extraction Step)-

The organic phase, into which nickel and lithium are together extracted, is stirred together with an aqueous solution wherein sulfuric acid is used to adjust the acid concentration, so as to shift nickel and lithium in the organic phase into a resultant water phase. By bringing this liquid for back extraction (i.e., the back extraction liquid=the sulfuric acid solution) into contact with the organic phase repeatedly, the nickel concentration and the lithium concentration in the back extraction liquid are raised so that nickel and lithium are concentrated. Actually, it is favorable to dilute the liquid after scavenging with water, adjust the nickel concentration and the acid concentration in the diluted liquid, and then use the resultant solution.

-Third Step (Scavenging Step)-

In this step, a 200 g/L solution of sulfuric acid in water is brought into contact with the nickel- and lithium-containing solution after the back extraction, thereby shifting fractions of the metals (Ni=30 mg/L, and Li=133 mg/L) that remain slightly in the organic phase substantially completely into the resultant water phase. After the scavenging, the amount of the metals in the oil phase turns to substantial zero. The oil phase is returned into the first step of solvent extraction step.

-Fourth Step (Nickel Extraction Step and Nickel Carbonation Step)-

In this step, the pH of the back extraction liquid yielded in the second step is adjusted to about 7 with sodium hydroxide, and then neodecanoic acid is applied to the back extraction liquid, so as to extract only nickel selectively into the resultant oil phase. The oil phase, into which nickel is extracted, is subjected to back extraction, and the resultant water phase is neutralized with sodium carbonate to recover nickel in the form of nickel carbonate.

-Fifth Step (Lithium Carbonation Step)

In this step, the liquid after the extraction, which is yielded in the fourth step, is neutralized with sodium carbonate to recover lithium in the form of lithium carbonate.

-Sixth Step (Nickel Powder Recovery Step)-

In this step, potassium oxalate is added to the liquid after the extraction in the fourth step, so as to separate nickel in the form of potassium oxalate, and then this salt is thermally decomposed at high temperature to recover nickel in the form of nickel powder.

After the addition of potassium oxalate, the pH of the liquid lowers into 0.9. However, the pH is kept at 1.5 by effect of an alkaline agent such as sodium hydroxide, and the components in the system are mixed with each other to promote the reaction. In this way, nickel oxalate is yielded. Nickel oxalate precipitates, and the salt is subjected to filtrating and drying treatments. Thereafter, the salt is thermally decomposed at high temperature to yield nickel powder. High temperature denotes a temperature in the range of about 330 to 370° C. The size of grains of the nickel powder is about 10 on average. The content thereof by percentage is 99.99% by mass.

EXAMPLES

Example 1

First Step (Ni and Li Solvent Extraction Step) Example

A spent lithium ion secondary battery was dismantled, and valuable metals therein were eluted out in an appropriate manner. Thereafter, from the resultant solution, manganese and cobalt were removed. About the resultant solution, which was a solution to be treated by the invention, an example of the composition thereof is shown in Table 1.

The lithium concentration in this solution is too low. Thus, even when the solution is subjected, as it is, to carbonation treatment, the amount of yielded lithium carbonate is small. Consequently, this manner will be inefficient. It is therefore necessary to concentrate nickel and lithium.

TABLE 1

|  | Ni (g/L) | Li (g/L) | Co (g/L) | Mn (g/L) |
|---|---|---|---|---|
| Ni and Li liquid before extraction | 8.9 | 4.0 | 0.02 | <0.001 |

The nickel and lithium solution having the composition shown in Table 1 was mixed with a solvent wherein 2-Ethylhexyl phosphonic acid mono-2-ethylhexyl ester (trade name: PC-88A, manufactured by Daihachi Chemical Industry Co., Ltd.) was diluted with a naphthene type solvent (trade name: shellsol D70, manufactured by Shell Chemicals) to give a concentration of 25% by volume, and the mixture was stirred. Nickel and lithium were together extracted therefrom at a specified equilibrium pH under conditions shown in each of Tables 2.

At this time, co-extraction of nickel and lithium can be attained by using three or more extraction stages.

For the adjustment of the equilibrium pH, a 25% solution of sodium hydroxide in water was used. Tables 2 show the extraction concentrations of nickel and lithium in the liquid (to be treated) before the extraction and the liquid after the extraction in cases where the pH was 8.5 (at four extraction stages), the pH was 7.5 (at four extraction stages), the pH was 7 (at four extraction stages) and the pH was 8.5 (at three extraction stages), respectively.

Based on the above result, it is found that lithium, in addition to nickel, is co-extracted.

TABLES 2

| Step | Temperature (° C.) | Ni (g/L) | Li (g/L) |
|---|---|---|---|
| Liquid before the extraction | 20-25 | 4.0 | 8.9 |
| Liquid after the extraction | 20-25 | <0.001 | 0.304 |
| * Equilibrium pH = 8.5 (four extraction stages) | | | |
| Liquid before the extraction | 20-25 | 4.0 | 8.9 |
| Liquid after the extraction | 20-25 | <0.001 | 1.314 |
| * Equilibrium pH = 7.5 (four extraction stages) | | | |
| Liquid before the extraction | 20-25 | 4.0 | 8.9 |
| Liquid after the extraction | 20-25 | <0.001 | 1.959 |
| * Equilibrium pH = 7 (four extraction stages) | | | |
| Liquid before the extraction | 20-25 | 4.0 | 8.9 |
| Liquid after the extraction | 20-25 | 0.015 | 1.04 |
| * Equilibrium pH = 8.5 (three extraction stages) | | | |

Figure 4:
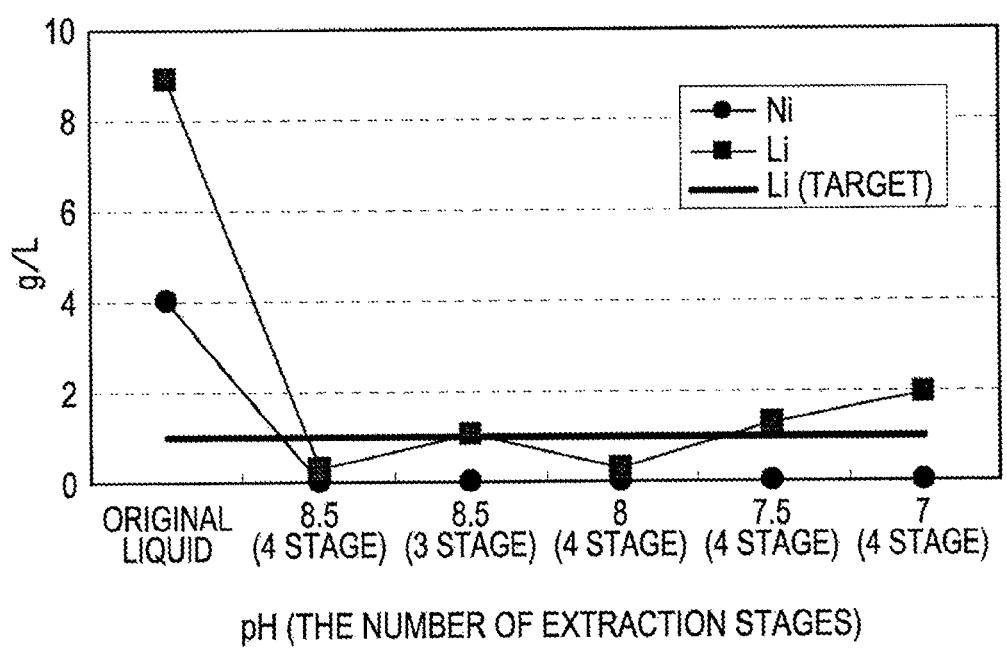
FIG. 4 is a graph showing the number of extraction stages, pH and the behaviors of Li and Ni in solution according to the embodiment of the present invention.

When the results including the above-mentioned results are shown in a graph, the graph is shown in FIG. 4. Its horizontal axis indicates the number of the extraction stages and the pH, and its vertical axis indicates the concentration of each of Ni and Li in the liquid after the extraction in each of the cases. From this result, it can be understood that the pH may be desirably 8.0 or more and the number of the extraction stages are desirably three or more (four or more stages may be more desirable).

Example 2

Second Step (Back Extraction Step) Example

An aqueous solution having a sulfuric acid concentration adjusted to 30 g/L was mixed with one of the organic phases after nickel and lithium were extracted. After the mixture turned into an equilibrium state, a change in each of the nickel concentration and the lithium concentration was examined with the passage of time. The supplied organic phase was the organic phase into which nickel and lithium were extracted at the equilibrium pH of 8.5 under the condition of Example 1. The results are shown in Table 3.

It is understood that by using the sulfuric acid solution (the back extraction liquid) repeatedly, nickel and lithium in the back extraction liquid are concentrated.

TABLE 3

| Step | Temperature (° C.) | Ni (g/L) | Li (g/L) |
|---|---|---|---|
| Oil phase before the back extraction | 20-25 | 4.6 | 1.8 |
| Oil phase after the back extraction | 20-25 | 0.029 | 0.13 |
| Water phase after the back extraction | 20-25 | 43.4 | 17.5 |

Sulfuric acid concentration in the original solution for the back extraction: 30 g/L; and that in this solution after the back extraction: 10 g/L Example 3

Third Step (Scavenging Step) Example

An aqueous solution having a sulfuric acid concentration adjusted to 200 g/L was mixed with the organic phase from which nickel and lithium were back-extracted. In Table 4 are shown results of the nickel concentration and the lithium concentration in the oil phase after the mixture turned into an equilibrium state.

It is understood that the nickel and lithium concentrations in the oil phase after the scavenging were substantially zero and thus the solvent was able to be regenerated.

TABLE 4

| Step | Temperature (° C.) | Ni (g/L) | Li (g/L) |
|---|---|---|---|
| Oil phase before the scavenging | 20-25 | 0.029 | 0.13 |
| Oil phase after the scavenging | 20-25 | <0.001 | 0.003 |

Acid concentration in the liquid for the scavenging: 200 g/L

Example 4

Fourth Step (Nickel Solvent Extraction and Nickel Carbonation Step) Example

The water phase into which nickel and lithium were back-extracted was mixed with a solvent wherein neodecanoic acid (trade name: VA-10, manufactured by Hexion Specialty Chemicals Inc. in Japan) was diluted with a naphthene type solvent (trade name: shellsol D70, manufactured by Shell Chemicals) to give a concentration of 25% by volume, and the mixture was stirred to extract substantially only nickel at the specified equilibrium pH under the conditions shown in one of Table 2.

TABLE 5

| Step | Temperature (° C.) | Ni (g/L) | Li (g/L) |
|---|---|---|---|
| Liquid before the extraction | 20-25 | 43.3 | 17.5 |
| Oil phase after the back extraction | 20-25 | 14.41 | 0.138 |
| Water phase after the back extraction | 20-25 | 54.3 | 0.52 |
| Water phase after the extraction | 20-25 | 0.09 | 13.7 |

Equilibrium pH = 8.5

Example 5

Fifth Step (Lithium Carbonation Step) Example

The pH of the liquid after the extraction, which was yielded in the fourth step, was adjusted into a pH of 9.5 to 10.5 with sodium hydroxide, and then the resultant liquid was neutralized with sodium carbonate to yield a lithium carbonate crystal.

The composition of the resultant lithium carbonate crystal and conditions of the carbonation are shown in Table 6.

TABLE 6

| Step | Temperature (° C.) | Ni (g/L) | Li (g/L) |
|---|---|---|---|
| Liquid before the carbonation | 20-25 | 0.09 | 13.7 |
| Liquid after the carbonation | | <0.001 | 2.8 |
| Lithium carbonate | 20-25 | 0.151% | 18.7% |

* Carbonation temperature: 75° C., and carbonation pH = 9.5-10.5

Example 6

Sixth Step (Nickel Powder Recovery Step)

Separately, potassium oxalate was incorporated into the water phase into which nickel was back-extracted, so as to produce nickel oxalate. At the time of the incorporation, the pH turned to 0.9. Thereto was added 25% by mass of NaOH until the pH turned to 1.5 so as to yield nickel oxalate. Thereafter, nickel oxalate, which was precipitating, was filtrated, dried and then thermally decomposed to yield nickel powder. Conditions for the recovery are shown in Table 7.

TABLE 7

| Step | Temperature (° C.) | Ni (g/L) | Li (g/L) |
|---|---|---|---|
| VA-10 liquid after the back extraction | 20-25 | 23.0 | 0.053 |

TABLE 7-continued

| Step | Temperature (° C.) | Ni (g/L) | Li (g/L) |
|---|---|---|---|
| Liquid after the oxalation | 20-25 | 0.067 | 0.3 |

Potassium oxalate concentration: 200 g/L
pH after the reaction: 2.0, nickel recovering percentage: 99.9%
Thermal decomposition temperature: 350° C., and decomposition period: 90 minutes The size of grains of the resultant nickel powder was 10 µm on average, and the content thereof by percentage was 99.9% by mass.

What is claimed is:

1. A method for extracting nickel and lithium comprising: solvent extraction step of using three or more extraction stages to subject a solution containing lithium and nickel to solvent extraction with 2-Ethylhexyl phosphonic acid mono-2-ethylhexyl ester at a pH of 8.0 to 8.5, whereby the nickel and the lithium are co-extracted into a resultant organic phase.

2. The method according to claim 1, wherein the solution containing lithium and nickel includes 5.0 to 15.0 g/L of nickel, 3.0 to 6.0 g/L of lithium, 0.01 to 0.03 g/L of cobalt, and less than 0.01 g/L of manganese.

3. A method for extracting nickel and lithium comprising: a solvent extraction step comprising three or more extraction stages, wherein each stage subjects a solution containing lithium and nickel to solvent extraction with 2-ethylhexyl phosphonic acid mono-2-ethylhexyl ester at a pH of 8.0 to 8.5, whereby the nickel and the lithium are co-extracted into a resultant organic phase, then
the resultant organic phase undergoes a back extraction step wherein the resultant organic phase undergoes back extraction with a sulfuric acid solution, whereby the nickel and the lithium are concentrated into a back extraction liquid.

4. The method according to claim 3, further comprising a nickel extraction and carbonation process which comprises:
adjusting pH of a water phase obtained by the back extraction step with sodium hydroxide;
subjecting the pH-adjusted liquid to extraction with neodecanoic acid to selectively extract nickel into a resultant oil phase; and
neutralizing the resultant oil phase by adding sodium carbonate to recover nickel in the form of nickel carbonate.

5. The method according to claim 4, further comprising:
neutralizing a liquid which is not extracted by the nickel extraction and carbonation process with sodium carbonate to recover lithium in the form of lithium carbonate.

6. The method according to claim 5, further comprising:
adjusting the liquid obtained by the nickel extraction and carbonation process to a pH of 9.5 to 10.5 before the neutralization.

7. The method according to claim 3, further comprising:
adjusting pH of the back extraction liquid with sodium hydroxide;
subjecting the pH-adjusted liquid to extraction with neodecanoic acid to selectively extract nickel into a resultant oil phase;
adding potassium oxalate to the resultant oil phase to produce a compound of nickel oxalate; and
decomposing the compound thermally and recovering nickel powder.

8. The method according to claim 7, further comprising:
adding an alkaline agent to keep the resultant oil phase at a pH of 1.5 or more to produce the compound of nickel oxalate.

9. The method according to claim 8, wherein the decomposing step includes heating the compound at 330 to 370 degrees C.

10. A method for extracting nickel and lithium comprising:
a solvent extraction step comprising three or more extraction stages, wherein each stage subjects a solution containing lithium and nickel to solvent extraction with 2-ethylhexyl phosphonic acid mono-2-ethylhexyl ester at a pH of 8.0 to 8.5, whereby the nickel and the lithium are co-extracted into a resultant organic phase, and then
the resultant organic phase undergoes a back extraction step wherein the resultant organic phase undergoes back extraction with a sulfuric acid solution, whereby the nickel and the lithium are concentrated into a back extraction liquid, and then
scavenging an oil phase obtained by the back extraction step with a solution having an acid concentration higher than the sulfuric acid solution used in the back extraction step, thereby effusing any nickel and the lithium remaining in the oil phase to a water phase, and then additionally subjecting the resulting oil phase to the solvent extraction step.

11. The method according to claim 10, further comprising a nickel extraction and carbonation process which comprises:
adjusting pH of a water phase obtained by the back extraction step with sodium hydroxide;
subjecting the pH-adjusted liquid to extraction with neodecanoic acid to selectively extract nickel into a resultant oil phase; and
neutralizing the resultant oil phase by adding sodium carbonate to recover nickel in the form of nickel carbonate.

12. The method according to claim 11, further comprising:
neutralizing a liquid which is not extracted by the nickel extraction and carbonation process with sodium carbonate to recover lithium in the form of lithium carbonate.

* * * * *